United States Patent [19]
Hall

[11] 3,738,384
[45] June 12, 1973

[54] FIVE-WAY CONTROL VALVE AND SYSTEM
[75] Inventor: John F. Hall, Bloomfield Hills, Mich.
[73] Assignee: Chrysler Corporation, Highland Park, Mich.
[22] Filed: Apr. 3, 1972
[21] Appl. No.: 240,503

[52] U.S. Cl.......... 137/493.9, 137/512.3, 137/512.5
[51] Int. Cl....................... F16k 17/00, G05d 27/00
[58] Field of Search ................. 137/493.9, 493, 38, 137/43, 512.3, 512.5

[56] References Cited
UNITED STATES PATENTS
1,893,942  1/1933  Jensen .......................... 137/512.3 X

*Primary Examiner*—Henry T. Klinksiek
*Assistant Examiner*—Robert J. Miller
*Attorney*—Oliver F. Arrett

[57] ABSTRACT

A five-way valve which performs five functions: pressure relief, vacuum relief, rollover shut-off, overfill limiting and anti-surge control for use in the fuel evaporative control system of motor vehicles.

3 Claims, 2 Drawing Figures

FIVE-WAY CONTROL VALVE AND SYSTEM

BACKGROUND OF THE INVENTION

This invention relates to fuel tank venting systems for motor vehicles. Evaporative losses of hydrocarbons from motor vehicle fuel tanks, carburetor bowls and the like, contribute to the unburned hydrocarbons emitted to the atmosphere. There have been many attempts to contain these emissions by discontinuing the practice of venting motor vehicle fuel tanks, as through the fuel caps, directly to the atmosphere.

Today, motor vehicles include fuel tank venting means for collecting and storing fuel vapors and routing them to the engine when it is operating. The interconnection of a fuel tank vapor venting system to the engine can result in liquid fuel carryover from the fuel tank which is undesirable. A liquid-vapor separator of some sort is usually included in such a system to provide for vapor-liquid separation with the vapor going to the engine and the liquid fuel draining back into the fuel tank from the separator. Factors which contribute to liquid-fuel carryover are liquid and vapor thermal expansion, the attitude of the vehicle, and maneuvering inertia forces which cause "surging" of the liquid fuel.

One automobile manufacturer provides vents in the upper front corners of the fuel tank and a central vent at the upper rear portion of the fuel tank, the vents being connected into vent lines which lead to a liquid-vapor separator mounted in the rear automobile kick-up. The liquid-vapor separator essentially consists of a container for receiving liquid fuel carried over the vent lines from the tank along with the fuel vapor. Another vent line communicates between the liquid-vapor separator container and a vapor storage means such as a charcoal canister. The separator container includes a float valve which acts to close the vent line leading to the vapor storage means when the liquid content in the container reaches a certain level. The closing of the float valve prevents liquid fuel carryover to the rest of the evaporative control system. Liquid fuel in the container drains back into the fuel tank by means of a drain line.

Other manufacturers have provided vents in each of the upper corners of the fuel tank with connecting vent lines which lead to a standpipe arrangement. For example, at least one manufacturer has eliminated evaporative emission loss from the fuel tank by sealing it and conducting the fuel vapors generated thereinto a vapor storage volume for utilization means in the engine crankcase by way of a standpipe arrangement contained in a motor vehicle trunk.

In this arrangement four vent lines in the fuel tank terminate in a standpipe-liquid vapor separator which is carried in the vehicle trunk. The standpipe is in turn provided with a drain for returning liquid fuel carryover back to the fuel tank. It is also provided with a vent line which leads to a vapor storage means such as the engine crankcase.

This system has been modified to include positionally responsive valves in at least the two front vent lines of the fuel tank, the valves being normally open when the vehicle is substantially level and closed when the vehicle assumes a downhill or canted position.

With systems of the type described above, it has, as previously stated, been necessary to provide some means to prevent overfilling of the fuel tank and the carryover of the liquid fuel through the vent lines to the vapor storage means. In the typical vented tank, as fuel enters the tank through the filler pipe, it displaces air and vapors therein. The air and vapors attempt to leave the tank by flowing out of the filler tube or through the vent lines. In such an arrangement, the fuel may completely displace the air and vapors in the tank filling it to the top and also filling the filler pipe. The liquid fuel is then able to flow through the vent line or lines particularly upon thermal expansion of the fuel, upon changes in attitude of the vehicle and upon maneuvering inertia forces of surging. This is undesirable and is to be avoided where possible.

One solution to this problem is disclosed in U. S. Pat. No. 3,517,654 entitled "Evaporative Emission Control System" which issued in the names of Jorma O. Sarto and William A. Hunter on June 30, 1970. The solution proposed therein comprises a small container carried inside the fuel tank at its top. The auxiliary container includes a small hole in its bottom for allowing fuel to leak into the auxiliary container as the main tank approaches a filled condition. A small hole is also included at the top of the auxiliary container to allow vapors contained therein to escape to the main tank. By making the inlet hole of the auxiliary chamber extremely small, the filling of the auxiliary chamber is delayed thereby allowing the main fuel tank to be filled without filling the auxiliary tank simultaneously. This delay provides an overfill limiting arrangement wherein the level in the main fuel tank drops after filling, as fuel flows into the auxiliary chamber. There is thus provided a means for assuring the presence of a vapor space or volume in the top of the main tank and thus maintaining a separation between the liquid fuel and the vent line or lines communicating with the tank in this space.

Another solution has been suggested for relieving this overfilling problem. Accordingly, there has been provided normally closed valve means in the vent line which communicates between the fuel tank and the vapor storage means. The valve is constructed and arranged to be pressure operated and is opened when a predetermined pressure exists inside the tank. The pressure required which is one that is greater than the pressure created by a filled tank. Such a valve arrangement is described in copending application Ser. No. 90,534 now U.S. Pat. No. 3,687,335, filed in the name of William A. Hunter and entitled "Overfill Limiting Apparatus for Fuel Tanks."

SUMMARY OF THE INVENTION

This invention provides a simplified five-way valve design which functions to control all of the above-discussed control problems and functions, which have heretofore been handled by a wide variety of separate means, plus fuel shut-off during vehicle rollover.

DESCRIPTION OF THE PREFERRED EMBODIMENTS

Figure 1:
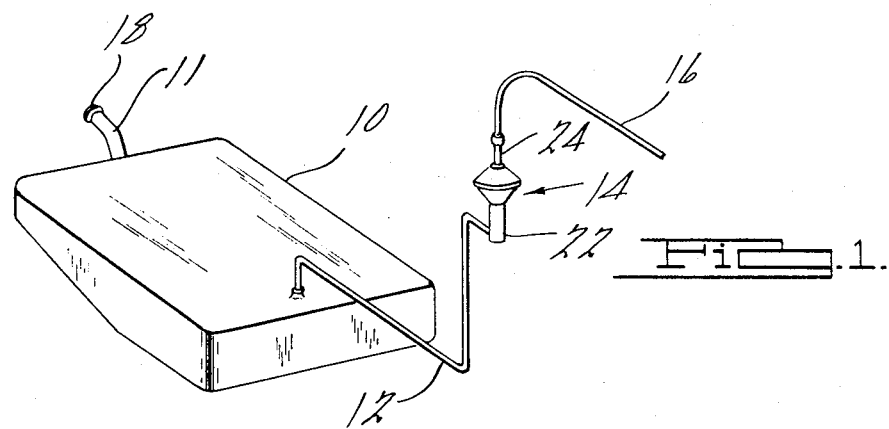
FIG. 1 is a perspective of a motor vehicle fuel tank showing the five-way valve of the invention.

Referring now to the drawing, FIG. 1 shows a motor vehicle evaporative control system including a sealed fuel tank 10 and a filler pipe 11 (fuel line, not shown).

Fuel tank 10 includes vent means such as line 12 which extends to the five-way valve of this invention, indicated generally at 14. Vapor transmission line 16 connects to valve 14 and extends to vapor utilization means (not shown) such as a carbon canister or the like as is known in the prior art. An optional liquid-vapor separator of the type shown in copending application Ser. No. 90,534 now U.S. Pat. No. 3,687,335 referred to hereinabove, or U. S. Pat. No. 3,517,654, also referred to hereinabove, may be interconnected into the vapor lines 12 or 16 at some desired point. The filler tube 11 is sealed by a tightly fitting cap 18. Vent line 12 may include at its terminus inside fuel tank 10, a plurality of vent lines as shown in the heretofore identified prior art or line 12 itself may comprise a plurality of lines extending from the tank to valve 14 or one vent line may be used as shown.

Figure 2:
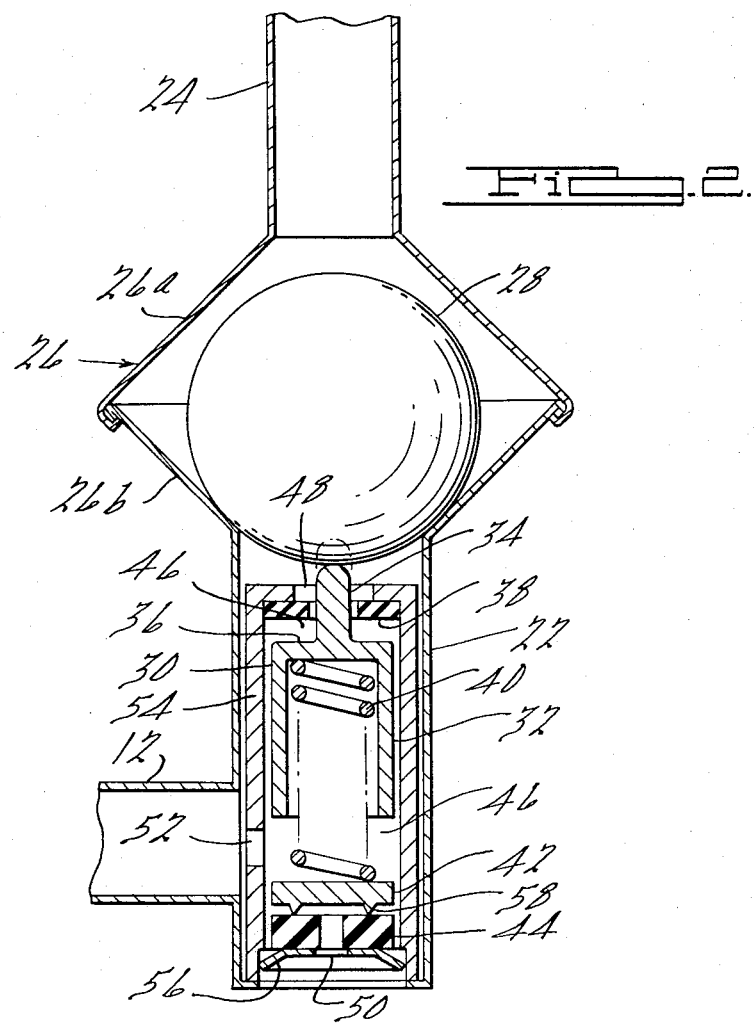
FIG. 2 is a sectional view of a preferred valve embodiment according to the invention.

Referring to FIG. 2, the five-way valve according to this invention will be described in detail. It comprises a housing body 20 having an inlet end generally indicated at 22 and an outlet end generally indicated at 24. Outlet end 24 is adapted for connection to any utilization means such as vent line 16 which may extend to an engine carburetor, an engine crankcase, a canister vapor storage means or the like. Intermediate the inlet and outlet ends is a ball valve housing portion 26 which may take the form of two cone-like sections 26a and 26b which may be pressed and fitted together as shown. Lower portion 26b particularly takes the form of a truncated cone which, when mounted upright as shown, receives a ball 28. The position of ball 28 is dependent upon the attitude of housing body 20 and will be centered therein as shown when housing 20 is substantially upright.

Lower inlet end 22 includes a plunger 30 having a lower cylindrical portion 32, a plunger rod 34 and an upper valve seat portion 36 which is adapted to seat against upper valve seat 38. Plunger 30 is biased upwardly against upper seat 38 by spring 40 which is housed inside of lower cylinder portion 32. The other end of spring 40 biases a lower valve closure member 42 downwardly against lower valve seat 44.

The five-way valve contains three separate openings which communicate with central flow passage 46. Outlet opening 48 communicates between flow passage 46 and outlet end 24. Atmospheric opening 50 communicates between flow passage 46 and the atmosphere. Vapor inlet opening 52 communicates between flow passage 46 and a conduit which may be attached thereto, such as vent line 12.

All of the above-noted components in inlet end 22 may preferably take the form of a sub-assembly carried in a sleeve-like sub-housing 54 into which the various components of the valve may be assembled therein with a spring-like locking ring 56 permanently holding them in place as shown. In such an arrangement, upper and lower seats 38 and 44 may take the form of washers, lower valve closure members may take the form of a flat washer or be of the type shown including a circular ridge portion 58 which sealingly engages lower valve seat 44 for more certain sealing operation.

When mounted in the vent line of an evaporative control system in a substantially up-right fashion, ball 28 rests centrally in lower housing portion 26b depressing plunger 30 as shown, in FIG. 2, thus opening outlet opening 48. However, vapor cannot flow therethrough in view of the sealing relationship maintained by the ball in a central position against lower housing portion 26b. Vapor pressure generated in the fuel container such as fuel tank 10 will ultimately reach a point at which it will raise ball 28 away from its seated position in lower housing portion 26b but not completely off the plunger, thus allowing vapors to escape through outlet opening 48 and out the outlet end 24. The weight of the ball is selected to provide such vapor pressure action at some predetermined value depending on the vapor pressure generated by the particular fuel container used and the surface area available therein for providing evaporated vapors.

This particular aspect of the five-way valve provides an overfill limiting arrangement similar to that disclosed in the aforementioned copending patent application serial No. 90,534 in which valve 14 is mounted in a vertical, normally closed, position with regard to ball 28 and the filler tube extends into the fuel tank to a level at which air and fuel vapors in the tank will be trapped during filling and forced to the top thereof as described in the aforementioned copending application.

As described therein it is only necessary that the normally closed ball valve arrangement including ball 28 operate at a predetermined pressure which is greater than the pressure created by the head of fuel in the filler pipe when the fuel tank is filled. Therefore, when filled, the tank is sealed, the valve i.e. ball 28 is closed and there is a vapor collection space and thermal expansion space provided at the top of the fuel tank 10. With evaporation and thermal expansion pressure, the pressure in the tank increases to a value greater than the head pressure and ultimately causes ball 28 to rise from its seat slightly by overcoming the weight of the ball, allowing vapor to flow through valve 14 and outlet end 24. Normally, the weight of ball 28 holds plunger 30 down away from upper seat 38 but during roll-over of the motor vehicle, movement of the ball off of plunger 30 will allow plunger 30, which is spring loaded by spring 40, to seal off the entire system by moving upper valve seat portion 36 sealingly against upper valve seat 38.

Positionally responsive valve means is provided by ball 28 and lower housing portion 26b which acts as a seat for ball 28. As pointed out hereinabove when the valve, and therefore the automobile, is in the normal position, i.e., the valve is vertical, ball 28 is centered in portion 26b, depressing plunger 30. The truncated conical valve seat provided by the shape of lower portion 26b, having an open upper end at the point where 26a joins 26b, which tapers to a smaller open lower end or seat for the ball 28 as shown in FIG. 2, allows the freely rollable ball 28 to move off the plunger when the attitude of the valve body or the motor vehicle changes. In effect the ball is free to roll up the side wall of portion 26b until it contacts the peripheral abutment provided by the upper portion 26a where the ball contacts it. The positional response of the valve and the ball may be adjusted to roll at various predetermined angles or changes in attitude depending on the angular design of the conical seat of portion 26b, the size of the ball 28 and its weight, among other things.

An anti-surge function is provided due to the fact that any surging movement of liquid fuel in the vent line extending between the fuel tank or other fuel reservoir and valve 14 will force plunger 30 upwardly against upper valve seat portion 36 thus sealing off the entire system. Surging is only momentary and so is the valve's sealing reaction thereto. With the cessation of surge, the ball will reseat itself pressing plunger 30 downwardly and opening outlet opening 48.

Lastly, spring 40 provides force to control vacuum relief, provided by means of lower valve closure member 42, which is normally seated sealingly against lower valve seat 44. Since opening 50 communicates between central flow passage 46 and atmosphere, the tension designed into spring 40 may be selected to provide vacuum relief in response to lower pressures inside the fuel vent system relative to that of the atmosphere at any predetermined selected level. Thus, when the vent system becomes evacuated to a range, for example, somewhere in the range of 7 to 14 inches of water, the atmosphere will force lower valve closure member 42 upwardly away from the lower valve seat 44 thus allowing atmospheric air to enter the system.

Having described the preferred embodiment of this invention exclusive property rights are claimed or defined as follows:

1. A five-way valve for use in motor vehicle evaporative control systems, comprising:
   A. a valve body having an upper outlet end portion, lower inlet end portion and an intermediate ball valve housing portion;
   B. a conical ball valve seat in the lower end of the ball valve housing portion adjacent the inlet end portion defining an open upper end and tapering to an open lower end smaller in diameter than the upper end, a peripheral abutment means disposed about the upper end of the seat;
   C. a freely movable ball in the ball valve housing portion, the normal position of which is in the ball valve seat by virtue of its weight, thus closing the valve to flow therethrough the diameter of the ball being smaller than that of the upper end of the seat but larger than that of the lower end of the seat;
   D. an upper valve seat in the lower inlet end portion having an axial opening communicating with the ball valve housing portion;
   E. an upper valve closure member in the inlet end portion beneath the upper seat adapted to move upwardly against the underside of the upper valve seat to close the valve to flow therethrough, the member having a plunger rod extending from its upper surface through the valve seat opening and contacting the ball whereby the member is spaced from the valve seat when the ball is seated;
   F. a lower valve seat in the inlet end portion having an axial opening communicating with the atmosphere;
   G. a lower valve closure member in the inlet portion above the lower seat, the member being adapted for movement downwardly against the lower seat to close the opening to the atmosphere;
   H. spring biasing means in the inlet portion extending between the upper closure member and the lower closure member, the tension of the spring being such that the lower closure member is normally urged against the lower seat while the upper closure member is urged downwardly from the upper seat by the weight of the ball, and
   I. an opening in the inlet end portion intermediate the valve closure members for receiving fuel vapors.

2. The valve according to claim 1 wherein:
   A. the ball valve seat is in the form of a truncated cone, and
   B. the inlet and outlet portions are cylindrical.

3. The valve according to claim 1 wherein: the components of the inlet portion are assembled in an elongated sleeve like means to form a subassembly adopted for insertion into the inlet portion.

* * * * *